INVENTOR
JOHN A. KITCHEN

Aug. 23, 1966   J. A. KITCHEN   3,267,985
PULSE COMBUSTION APPARATUS
Filed March 12, 1964   2 Sheets-Sheet 2

INVENTOR
JOHN A. KITCHEN
BY *Maybee & Legris*
ATTORNEYS

United States Patent Office 3,267,985
Patented August 23, 1966

3,267,985
PULSE COMBUSTION APPARATUS
John A. Kitchen, Markham, Ontario, Canada
(R.R. 2, Aurora, Ontario, Canada)
Filed Mar. 12, 1964, Ser. No. 351,284
23 Claims. (Cl. 158—4)

This invention relates to pulse combustion apparatus and in particular to a gaseous fuel heater of the pulse combustion type.

The term pulse combustion apparatus refers to an engine that includes a combustion chamber, an exhaust pipe which forms a resonant system with the combustion chamber, and a means for admitting a charge of air and fuel into the combustion camber at timed intervals. The means for admitting a charge of air and fuel usually includes a one-way valve that is closable by pressure pulses within the combustion chamber. In a conventional pulse combustion apparatus, such as the V-1 pulse jet engine of World War II, the charge of air and fuel is introduced into the combustion chamber where it is ignited and then expands through the exhaust pipe. Over-expansion occurs which results in a partial vacuum transient within the combustion chamber and this transient assists in drawing into the combustion chamber a fresh charge of air and fuel. Once started, the engine is self-sustaining.

It has been proposed to utilize pulse combustion apparatus for heating fluids by bringing the fluid to be heated into heat exchange relationship with the exhaust pipe. It can be shown that heaters of this kind are potentially more efficient than conventional heaters, but despite this advantage they have not been widely accepted, partly because of the difficulty in achieving stable combustion under a wide range of operating conditions found in domestic service and because of the difficulty in achieving quiet operation.

An object of this invention therefore is to provide a heater of the pulse combustion type that is reliable, efficient and reasonably quiet in operation.

The foregoing and still further objects and advantages of the invention will become apparent from a study of the following specification taken in conjunction with the accompanying drawings, in which like reference characters indicate corresponding parts throughout the several views, and in which.

Figure 1:
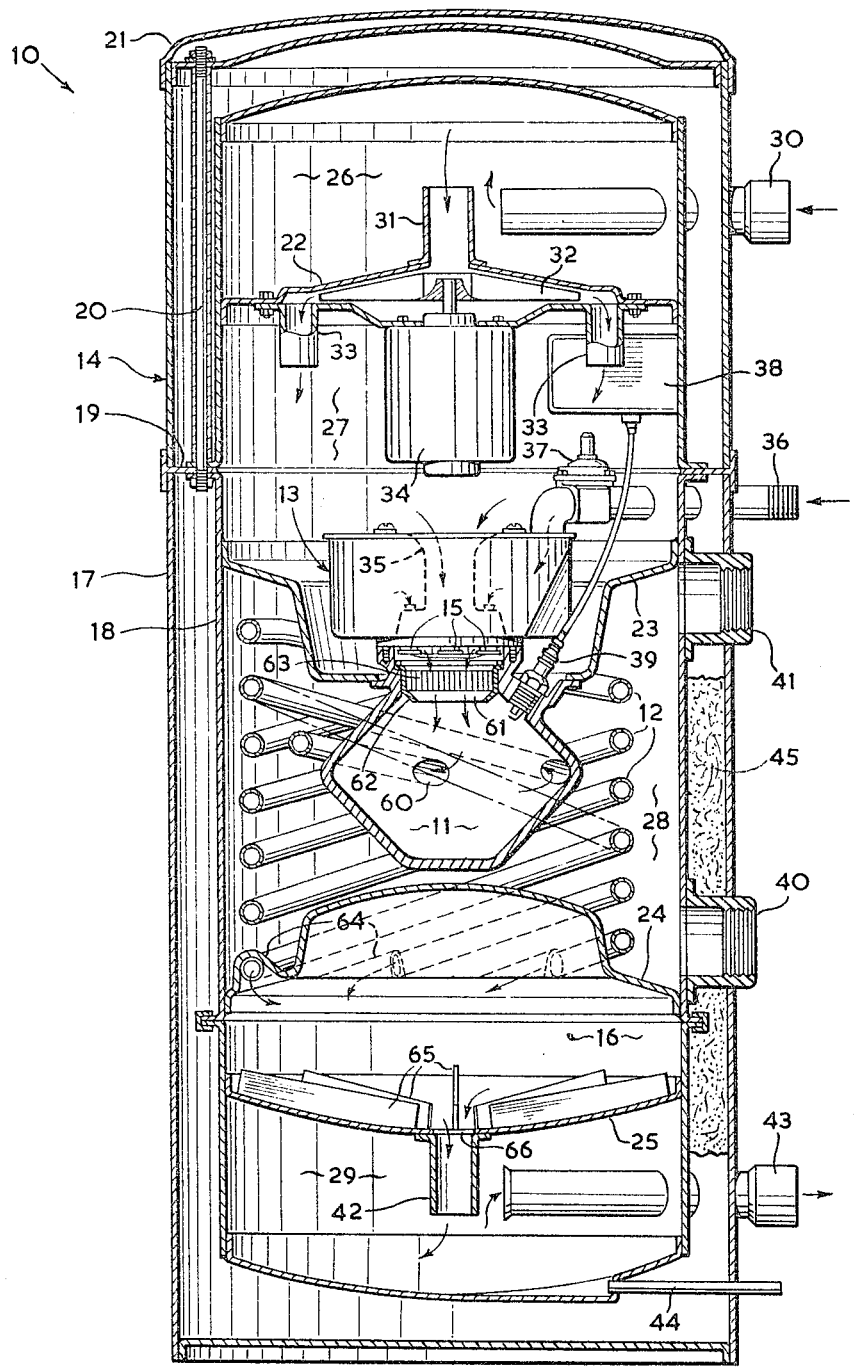
FIG. 1 is a longitudinal crosss-sectional view of a heater of the pulse combustion type constructed in accordance with the invention.

Referring to the drawings and in particular to FIG. 1, a heater of the pulse combustion type is generally indicated at 10, and it includes a combustion chamber 11, elongated exhaust pipes 12 and an air and fuel admitting means 13, all of these components being mounted within a housing 14. The air and fuel admitting means includes one-way valves 15 that communicate with a source of air and of fuel. After ignition of a charge of air and fuel, hot burning gases are expelled through the exhaust pipes 12 and into an exhaust chamber 16, to be eventually vented to the atmosphere. Fluid is permitted to freely circulate around the exhaust pipes 12 and is thereby heated.

Preferred forms of a housing, air and fuel admitting means, combustion chamber and exhaust pipes, and exhaust chamber will now be described in greater detain. Throughout the following description reference is made to a gaseous fueled water heater that was rated at 100,000 B.T.U. per hour.

*The housing.*—The housing 14 includes a cylindrical outer casing 17 and a cylindrical inner casing 18, which, for ease of maintenance and manufacture can be assembled in three parts that are removably coupled to each other by any conventional means. The outer casing 17 is provided with an inwardly extending annular flange 19 and the inner casing 18 is supported on the flange 13 and is held in place by studs 20. A removable lid 21 is provided to conceal the upper ends of the studs 20.

The inner casing 18 is divided internally by partitions 22, 23, 24 and 25 into chambers 26, 27, 28, 16 and 29, respectively. Air enters the chamber 22 through a pipe 30 and it then flows through a blower inlet pipe 31 of a diameter of about 1″ to a blower 32 from whence it is diverted into the chamber 27 through pipes 33. The chamber 27 is referred to below as an "air cushion chamber" and it serves as a reservoir for combustion air.

The blower 32 is operated by an electric motor 34 when the heater is being started; after ignition the combustion process is self aspirating.

Air in the air cushion chamber 27 flows through an air metering orifice 35 into the air and fuel admitting means 13; gaseous fuel flows through a fuel pipe 36 via a separate path in the air and fuel admitting means, to be eventually mixed with the air after both have issued from the one-way valves 15. A fuel pressure regulator 37 in the fuel pipe 36 is located inside the air cushion chamber; the regulator 37 is thus in direct pressure-responsive relation with the air cushion chamber 27 and is able to maintain a substantially constant relationship between the pressure of the fuel and the pressure of the air within the air cushion chamber 27. This results in a substantially constant air/fuel ratio; this arrangement is advantageous because it tends to improve the reliability of the heater.

Also mounted within the air cushion chamber is an ignition transformer 38 that is connected to a spark plug 39 by means of a high tension lead.

The combustion chamber 11 and the air and fuel admitting means 13 are mounted on opposite sides of the partition 23, and a fluid inlet 40 and an outlet 41 permit fluid to be circulated in the chamber 28.

The exhaust pipes are connected at one end to the combustion chamber and at their opposite ends of the exhaust chamber 16. Exhaust gases in the exhaust chamber are directed through a pipe 42 into the chamber 29, from whence they are vented to atmosphere through a pipe 43. A slender pipe 44 is provided to drain condensate that collects in the chamber 29.

Suitable insulation 45 is provided in the space between the outer casing 17 and the inner casing 18. Heavy dense material such as asphalt felt paper or concrete have been found to be more effective than lighter materials such as fibrous glass or rock wool.

Figure 2:
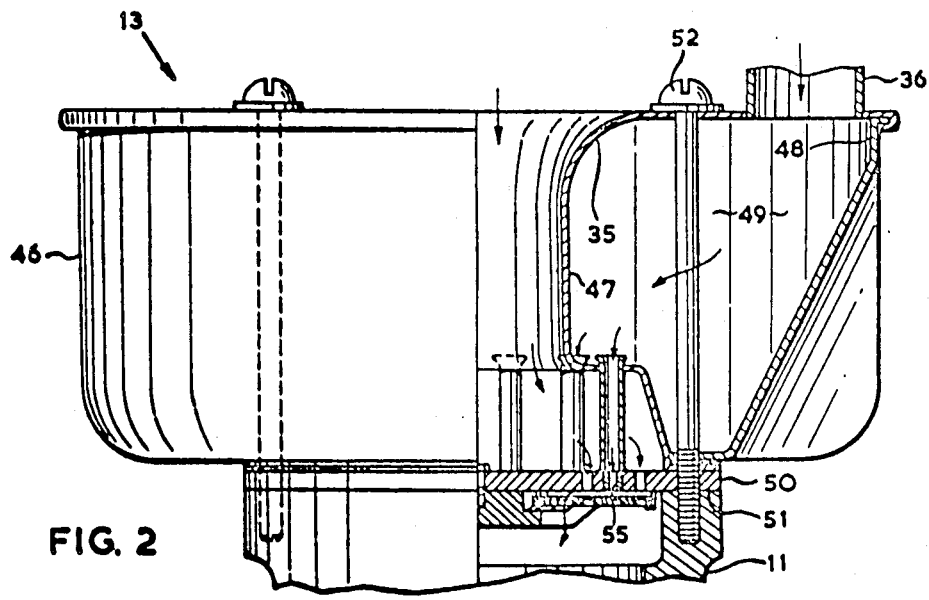
FIG. 2 is a front view, partly in section, of the air and fuel admitting means of the heater shown in FIG. 1.
Figure 3:
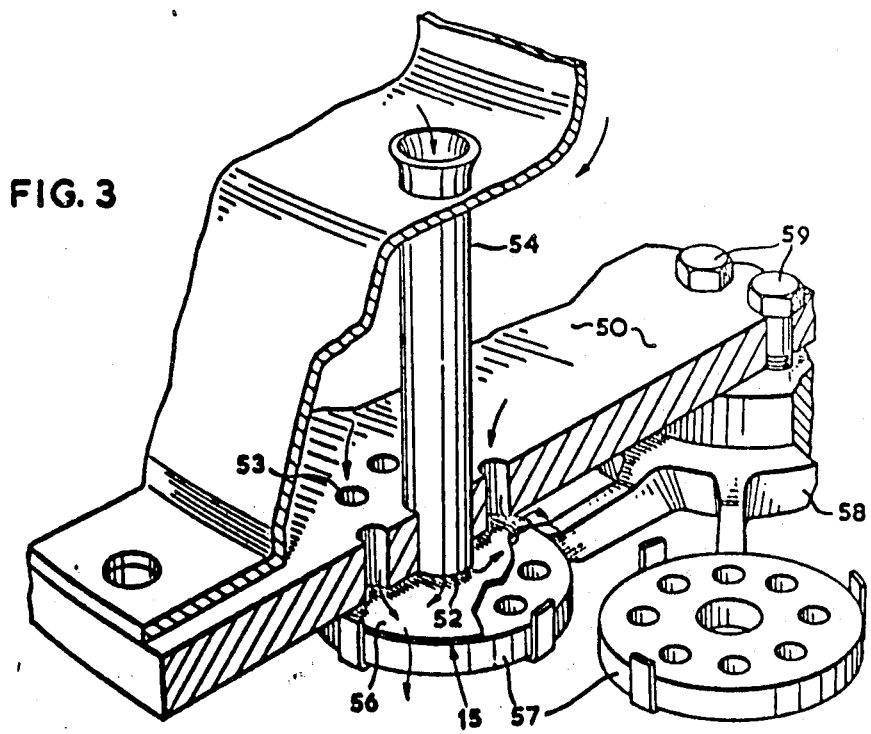
FIG. 3 is a perspective view, partly in section, of the one-way valves shown in FIGS. 1 and 2.

*The air and fuel admititng means.*—Referring now to FIGS. 2 and 3, the air and fuel admitting means includes a housing 46 within which is mounted a central duct 47 for air. The duct 47 constitutes the air metering orifice referred to above and it has a flared upper end that is about 2½″ in diameter and a neck that is about 1¼″ in diameter.

Surrounding the duct 47 is a circumferential partition 48 which, together with the duct, defines an annular fuel chamber 49 within the housing 46; the fuel pipe 36 discharges into the fuel chamber 49. Both the duct 47 and the partition 48 are supported by a flat, circular valve plate 50 which itself is supported by an upper edge 51 of the combustion chamber 11, and the assembly just described is connected to the combustion chamber by means of bolts 52 that are threaded into the upper end of the combustion chamber 11.

The valve plate 50 is provided with sets of openings for air and fuel arranged in the following manner. For each one-way valve 15 (and in this embodiment there are nine one-way valves) a central opening 52 for fuel is provided, which opening is surrounded by circumferentially arranged air openings 53. Slender fuel pipes 54 connect the fuel chamber 49 to the fuel openings 52. Inside the fuel openings 52 are removable fuel metering orifices 55.

Directly below each set of valve openings is a light and freely movable diaphragm or valve disc 56 of any suitable material, such as plastic, metal, plastic coated metal or plastic coated fabric. An excellent material for this purpose is fabric coated with polychlorotrifluoroethylene sold under the trademark Kel-F by M. W. Kellogg Co. The valve discs 56 are about 0.6" in diameter and are about 0.012" thick; the clearance of the valve discs should be between 0.045" and 0.055". The valve discs 56 are supported by circular perforated plates 57 which are secured to radially extending arms that emanate from a central hub 58. The hub 58 is secured to the valve plate 50 by means of bolts 59.

The perforations in the plates 57 permit pressure waves from the combustion chamber to force the valve discs 56 against the valve openings, thereby stopping the flow of air and fuel.

For heaters of a capacity less than about 500,000 B.t.u. per hour, the diameter of the air openings 53 is preferably between about 1/16" and 1/8" and for heaters of a capacity greater than about 500,000 B.t.u. per hour the diameter of the air openings 53 is preferably between 1/8" and 3/8". Light materials such as plastic coated fabric are suitable for capacities less than about 500,000 B.t.u. per hour, but for heaters of capacities greater than about 500,000 B.t.u. per hour, stronger materials such as metal should be used. For heaters of a capacity less than about 500,000 B.t.u. per hour, one valve should be provided for about every 10,000 to 20,000 B.t.u. per hour capacity. For heaters of a capacity greater than about 500,000 B.t.u. per hour, one valve should be provided for about every 20,000 to 50,000 B.t.u. per hour capacity. In this embodiment the heater was rated at about 100,000 B.t.u. per hour and nine valves were used, as indicated above. I have found that the use of a plurality of valves instead of a single valve tends to decrease noise attributable to the air and fuel admitting means.

*The combustion chamber and exhaust pipes.*—The combustion chamber 11 has substantially the shape of two conical shells joined together at their major diameters along a common line of juncture; five equi-spaced exhaust outlets 60 are provided along the line of juncture. An inlet 61 is provided at the upper end of the combustion chamber, i.e. at the vertex of one of the conical shells. A nozzle 62 serves to direct an incoming charge of air and fuel to the center of the combustion chamber, and it tends to prevent random spreading of the charge which is a cause of unstable combustion. Immediately above the nozzle 62 is a flame arrestor 63 which comprises a spirally coiled metallic strip the convolutions of which are separated by the corrugations in the strip. The spark plug 39 is used for starting the heater; after the first few explosions the combustion process is self-sustaining.

The exhaust pipes 12 are elongated tubes, preferably of stainless steel, and they are approximately tangent to the combustion chamber at their connection therewith. There are five exhaust pipes in the embodiment illustrated and described and they are arranged in a helix within the fluid chamber 28. The exhaust pipes are about 72" long and about 1/2" in diameter.

The particular configurations of the combustion chamber and of the exhaust pipes are advantageous because flame drawn into the combustion chamber during a vacuum transient is directed to the outer surface of a fresh charge of air and fuel; burning of the charge then occurs radially inward, and the burning gases expand radially outward to the combustion chamber outlets 60. The flame or returning high temperature gas is thus directed into a circular path around the fresh charge. A vortex is formed in the center of the combustion chamber; the vortex tends to counteract the pressure of combustion. Although it is preferable that the exhaust tubes are approximately tangent to the combustion chamber, deviations of up to about 45° are permissible.

The above referred to vortex tends to shut-off the supply of air and fuel and therefore it acts as a one-way valve to some extent. In some heaters where a strong cycle is not required, it is possible that the one-way valves can be omitted because such apparatus can resonate without the presence of such valves.

*Exhaust chamber.*—The exhaust chamber 16 is defined by the partitions 24 and 25, and it serves as an exhaust cushion chamber and exhaust silencer. The partition 24 is domed and is provided with equi-spaced circumferentially arranged receptacles 64 into which the lower ends of the exhaust pipes 12 extend. The exhaust pipes are approximately tangent to the partition 24 at their connection therewith; although deviations from the tangent are permissible, it is desirable that the exhaust pipes 12 make as low an angle with the partition 24 is possible; deviations up to about 45° from the tangent are however, permissible. The above arrangement causes pressure waves from the exhaust outlets to be directed into a circular pattern within the exhaust chamber.

The partition 25 has radially disposed blades 65 that direct the flow of exhaust gases into a toroidal flow pattern; the gases, flowing in a circular path that is more or less horizontal, are caused to move upwardly by the blades 65. This increases the rate of heat transfer to the partition 24 and tends to prevent a vortex from forming at an exhaust outlet 66. The blades 65 also serve to reduce the noise level in the exhaust gas flow because they act as baffles.

The heater described above is specially adapted for burning gaseous fuel such as natural gas or propane, but it is to be understood that principles of the invention are applicable to heaters for burning other fuels, such as fuel oil or coal dust. For such heaters a different means would be necessary for introducing fuel into the combustion chamber.

It will be understood that the form of the invention herewith shown and described is a preferred example and that various modifications can be carried out without departing from the spirit of the invention or the scope of the appended claims.

What I claim as my invention is:

1. A pulse combustion apparatus comprising a combustion chamber having an inlet and at least one outlet, means for admitting a charge of air and fuel into the combustion chamber through the inlet thereof and in timed relation with pressure pulses therein, an air cushion chamber to provide a reservoir for air and having an inlet for air and an outlet in communication with the air and fuel admitting means, and fuel pressure regulating means in direct pressure responsive relation with air in the air cushion chamber to maintain a substantially constant relationship between the pressure of fuel and the pressure of air within the air cushion chamber, whereby a substantially constant air/fuel ratio is maintained.

2. A pulse combustion apparatus as claimed in claim 1, wherein the air and fuel admitting means includes at least one valve that is in direct pressure responsive relation with the combustion chamber and is intermittently closable by pressure pulses therein.

3. A pulse combustion apparatus comprising a combustion chamber having an inlet and at least one outlet, valve means for admitting air and fuel into the combustion chamber and which is in direct pressure responsive relation with the combustion chamber and intermittently closable by pressure pulses therein, an air cushion chamber to provide a reservoir for air and having an inlet for air and an outlet in communication with the valve means, fuel pressure regulating means in direct pressure responsive relation with the air cushion chamber to maintain a substantially constant relationship between the pressure of fuel and the pressure of air within the air cushion chamber whereby a substantially constant air/fuel ratio is maintained, an exhaust chamber having at least one inlet and having an outlet in communication with the surrounding atmosphere, and at least one elongated exhaust pipe in communication at one end with a combustion chamber outlet and at its other end with an exhaust chamber inlet.

4. A pulse combustion apparatus as claimed in claim 3, wherein the fuel pressure regulating means is a fuel pressure regulator situated within the air cushion chamber.

5. A pulse combustion apparatus as claimed in claim 3, wherein the fuel is gaseous.

6. A pulse combustion apparatus as claimed in claim 3, wherein the fuel is natural gas or propane.

7. A pulse combustion apparatus comprising a combustion chamber that is defined by two substantially conical shells that are joined together at their major diameters along a common line of juncture, the combustion chamber having an inlet at the apex of one of said shells for admitting a charge of mixed air and fuel and at least one outlet located along the line of juncture between the two conical shells, and at least one elongated open-ended exhaust pipe connected at one end to a combustion chamber outlet, said exhaust pipe forming an angle of less than about 45° to the combustion chamber at its connection therewith whereby hot exhaust gases returning to the combustion chamber contact the outer surface of a fresh charge of air and fuel so that ignition of the fresh charge proceeds radially inward from the outer surface of the fresh charge and returning hot exhaust gases flow in a substantially circular path within the combustion chamber.

8. A pulse combustion apparatus as claimed in claim 7 wherein a nozzle is provided at the combustion chamber inlet for directing an incoming charge of air and fuel to the center of the combustion chamber and for retarding random spreading thereof.

9. A pulse combustion apparatus as claimed in claim 7 wherein said at least one exhaust pipe is substantially tangent to the combustion chamber at its connection therewith.

10. A pulse combustion apparatus having a thermal capacity of less than about 500,000 B.t.u. per hour, comprising a combustion chamber having an inlet and at least one outlet; and a plurality of valves for admitting air for combustion into the combustion chamber through the inlet thereof, there being one valve for about every 10,000 to 20,000 B.t.u. per hour of capacity of the apparatus, the valves each comprising a plate having a plurality of air openings in communication with a supply of air, the air openings being between about $1/16''$ and $1/8''$ in diameter, and a solid, circular diaphragm that is in pressure responsive relation with the combustion chamber and movable from a valve closing position where it covers the openings to an open valve position, in response to pressure pulses in the combustion chamber.

11. A pulse combustion apparatus having a thermal capacity of greater than about 500,000 B.t.u. per hour, comprising a combustion chamber having an inlet and at least one outlet; and a plurality of valves for admitting air for combustion into the combustion chamber through the inlet thereof, there being one valve for about every 20,000 to 50,000 B.t.u. per hour of capacity of the apparatus, the valves each comprising a plate having a plurality of air openings in communication with a supply of air, the air openings being between about $1/8''$ and $3/8''$ in diameter, and a solid, circular diaphragm that is in pressure responsive relation with the combustion chamber and movable from a valve closing position where it covers the openings to an open valve position, in response to pressure pulses in the combustion chamber.

12. A pulse combustion apparatus comprising a combustion chamber having an inlet and at least one outlet; and at least one valve for admitting air and fuel into the combustion chamber through the inlet thereof, the valve comprising a plate having a fuel opening in communication with a supply of fuel and a plurality of air openings surrounding the fuel opening and in communication with a supply of air, and a single, solid, circular diaphragm that is in pressure responsive relation with the combustion chamber and movable from a valve closing position where it covers all of the air and fuel openings of a valve to an open valve position, in response to pressure pulses in the combustion chamber.

13. A pulse combustion apparatus as claimed in claim 12, wherein the plate is circular and wherein a plurality of circumferentially arranged, equi-spaced sets of air and fuel openings are formed in the plate, there being one diaphram for every set of air and fuel openings.

14. A pulse combustion apparatus as claimed in claim 13 wherein there is one set of air and fuel openings for about every 10,000 to 20,000 B.t.u. per hour of capacity of the apparatus.

15. A pulse combustion apparatus as claimed in claim 13 wherein the thermal capacity of the apparatus is less than about 500,000 B.t.u. per hour, the diameter of the air openings is between about $1/16''$ and $1/8''$ and there is one set of air and fuel openings for about every 10,000 to 20,000 B.t.u. per hour of thermal capacity of the apparatus.

16. A pulse combustion apparatus as claimed in claim 13 wherein the thermal capacity of the apparatus is greater than about 500,000 B.t.u. per hour, the diameter of the air openings is between about $1/8''$ and $3/8''$ and there is one set of air and fuel openings for about every 20,000 to 50,000 B.t.u. per hour of thermal capacity of the apparatus.

17. A pulse combustion apparatus as claimed in claim 7, wherein a flame arrestor is provided at the inlet of the combustion chamber, the flame arrestor comprising a spirally coiled corrugated metallic strip, the convolutions of which are separated by corrugations in the strip.

18. A pulse combustion apparatus as claimed in claim 17, wherein a nozzle is provided between the flame arrestor and the combustion chamber for directing an incoming charge of fuel to the center of the combustion chamber and for retarding random spreading thereof.

19. A pulse combustion apparatus comprising a combustion chamber having an inlet and at least one outlet; a first exhaust chamber comprising a housing having an upper end wall and a lower end wall, the exhaust chamber being provided with at least one exhaust inlet near the periphery of the upper end wall; at least one elongated exhaust pipe connected at one end to a combustion chamber outlet and at its opposite end to an exhaust chamber inlet and forming an angle therewith of less than about 45° to direct exhaust gases from the combustion chamber into a substantially circular path within the exhaust chamber, the exhaust chamber having an outlet pipe at about the center of the lower end wall; and a second exhaust chamber having an outlet for venting exhaust gases into the atmosphere, said outlet pipe extending into said second exhaust chamber.

20. A pulse combustion apparatus as claimed in claim 19, wherein a plurality of radial fins are provided on the inner surface of the lower end wall of said first exhaust chamber.

21. A pulse combustion apparatus as claimed in claim 19, wherein the upper and lower end walls of said first exhaust chamber are substantially circular in plan and the said upper end wall has a plurality of equi-spaced exhaust gas inlets arranged around its periphery.

22. A pulse combustion heater comprising a housing; an air cushion chamber within the housing and having an inlet for air; an exhaust chamber having at least one inlet and an outlet for products of combustion; a fluid chamber having an inlet and an outlet for fluid to be heated; a combustion chamber within the fluid chamber that is defined by two substantially conical shells that are joined together at their major diameters along a common line of juncture, the combustion chamber having an inlet for a charge of air and fuel and at least one outlet located along the said line of juncture; at least one elongated exhaust pipe connected at one end to a combustion chamber outlet, and forming an angle of less than about 45° to the combustion chamber at its connection therewith, whereby hot exhaust gases returning to the combustion chamber contact the outer surface of a fresh charge of air and fuel so that ignition of the fresh charge proceeds radially inward from the outer surface of the fresh charge and returning hot exhaust gases flow in a substantially circular path within the combustion chamber; and at least one valve for admitting air and fuel into the combustion chamber through the inlet thereof, said valve comprising a plate having a fuel opening in communication with the supply of fuel and a plurality of air openings surrounding the fuel opening and in communication with the air cushion chamber, and a diaphragm that is in pressure responsive relation with the combustion chamber and movable from a valve closing position where it covers all of the valve air and fuel openings of a valve to an open valve position in response to pressure pulses in the combustion chamber; the opposite end of said exhaust pipe being connected to an exhaust chamber inlet and forming an angle of less than about 45° therewith to direct exhaust gases from the combustion chamber into a substantially circular path within the exhaust chamber.

23. A pulse combustion heater as claimed in claim 21, wherein there are five exhaust pipes arranged in a helix within the fluid chamber.

References Cited by the Examiner

UNITED STATES PATENTS

| | | | |
|---|---|---|---|
| 1,892,115 | 12/1932 | McKee | 158—119 |
| 2,563,026 | 8/1951 | Goddard | 158—4 |
| 2,605,109 | 7/1952 | Myers | 158—4 |
| 2,707,515 | 5/1955 | Lafferentz et al. | 158—4 |
| 2,768,031 | 10/1956 | Tenney et al. | 158—4 |
| 2,965,079 | 12/1960 | Collinson | 122—24 |
| 3,192,986 | 7/1965 | Haag | 158—4 |

FOREIGN PATENTS

| | | |
|---|---|---|
| 1,039,035 | 5/1953 | France. |
| 908,388 | 10/1962 | Great Britain. |

FREDERICK L. MATTESON, JR., *Primary Examiner.*

E. G. FAVORS, *Assistant Examiner.*